United States Patent Office 3,318,675
Patented May 9, 1967

3,318,675
METHOD FOR INHIBITING PLANT GROWTH
John F. Olin, St. Louis, Mo., assignor to Monsanto Company, St. Louis, Mo., a corporation of Delaware
No Drawing. Filed Feb. 3, 1964, Ser. No. 342,247
8 Claims. (Cl. 71—2.3)

This invention relates to compositions and methods for controlling and protecting plant life. In a preferred aspect, this invention relates to compositions and methods for selectively destroying undesirable existing plant growth in the presence of desirable plant growth by the application of a phytotoxic amount of an N-aryl dithiooxamide to the foliage of the undesirable plants. In another aspect, this invention relates to compositions and methods for protecting desirable plant growth from harmful insects and diseases by the application of a pesticidally effective amount of an N-aryl dithiooxamide to the foliage of existing plants. In yet another aspect, this invention relates to N-halogenated aryl dithiooxamides as new compositions of matter.

In recent years, the use of chemicals for controlling various biological forms has found widespread acceptance among many people. This is especially true among agriculturalists interested in controlling plant systems and insect pests. For example, chemical compositions have previously been applied to the soil or to the foliage of fully developed plants, thereby destroying certain types of plants in a selective manner and allowing others to continue their growth in a more favorable environment. This type of control, enabling certain plants to grow freely unhampered by competing noxious plants, has also been achieved by the application of chemical compositions to the soil, which chemical compositions either prevent germination of undesirable seeds or destroy the emerging seedlings immediately after germination. Other dangers confronting plant growth and crop yields occur in the form of insect pests and plant diseases. These threats to desirable plant life have been lessened by the application of insecticides and fungicides to the soil, foliage of plants, and surrounding atmosphere.

Very effective control and protection of desirable plant life is therefore possible through the use of chemicals formulated to provide protection as selective herbicides, insecticides, and plant fungicides. However, all requirements for effectiveness and selectivity among pesticides have not been satisfied. There are still many demands to satisfy, either for more effective pesticides with a greater selectivity than an old pesticide, or for pesticides with a different selectivity.

It is a primary object of this invention to provide novel herbicidal compositions, selectively active on foliar contact. It is a further primary object of this invention to provide methods for the selective destruction of existing undesirable plant growth. It is another object to provide novel biologically toxic compositions useful in the protection of desirable plant life. It is yet another object to provide methods for protecting desirable plant life. It is another object of this invention to provide N-haloaryl dithiooxamides as novel compositions of matter. Additional objects, benefits, and advantages will become apparent as the detailed description of the invention proceeds.

The compounds useful in the practice of the present invention are those having the molecular configuration:

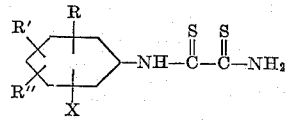

where R is a hydrogen, hydroxyl, or nitro radical or aliphatic hydrocarbyl or aliphatic hydrocarbyloxy radical having up to four carbon atoms; where R' and R" are hydrogen, hydroxyl, halogen or nitro radicals or aliphatic hydrocarbyl or aliphatic hydrocarbyloxy radicals having up to four carbon atoms; and where X is a hydrogen or halogen radical.

The N-aryl dithiooxamides useful in the practice of this invention can contain an unsubstituted phenyl group attached to the nitrogen atom, as for example, N-phenyl dithiooxamide. The present invention also encompasses compounds containing substituents on the aromatic ring in either the ortho, meta or para position. Furthermore, combinations of ortho and meta, ortho and para, meta and para, di-meta, and ortho, meta and para substitutions are within the scope of this invention.

Substitutions on the ring can range to as high as four substituents, the type of substituents being limited as characterized by the above generic formula. These substitutions on the ring can consist of halogen radicals, particularly chlorine, of nitro radicals, of hydroxyl radicals, and of aliphatic hydrocarbyl and aliphatic hydrocarbyloxy radicals having up to four carbon atoms. Compounds illustrative of these many possible substitutions include N - (2 - methoxy - 3,4 - dichloro - 6 - ethylphenyl)dithiooxamide, N-(2-allyl - 3,4 - dichlorophenyl)dithiooxamide, N - (2,4 - dibromo - 3 - hydroxy - 6 - vinylphenyl)dithiooxamide, N-(2,4,5-trichlorophenyl)dithiooxamide, N-(4-isopropylphenyl)dithiooxamide, N - (2 - chloro - 3,4 - diethoxyphenyl)dithiooxamide, N-(2-chloro-4-vinylphenyl) dithiooxamide, N-(2-methoxy-3 - nitro - 5 - chlorophenyl) dithiooxamide, N - (3 - nitro - 4 - tert-butylphenyl)dithiooxamide, and N-(2 - methyl - 3,4 - dibromophenyl)dithiooxamide.

Compounds included within the above formula which are preferred for use in this invention are compounds of the formula

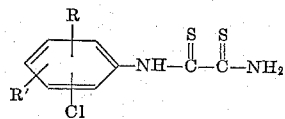

where R is a hydrogen radical or an alkyl radical having up to four carbon atoms; and where R' is a hydrogen or chloro radical or an alkyl radical having up to four carbon atoms. Examples of preferred dithiooxamides include N-(3-chlorophenyl)dithiooxamide, N-(3-chloro - 4-ethylphenyl)dithiooxamide, N-(5-chloro-3,4-dimethylphenyl) dithiooxamide, N-(2,4-dichlorophenyl)dithiooxamide, and N-(3,4-dichloro-5-tert-butylphenyl)dithiooxamide.

Compounds of this invention are useful as biological toxicants. The most distinctive utility of the novel compounds is based upon their ability to inhibit or destroy existing plant growth in a selective manner. The herbicidal activity can be demonstrated by contacting an established plant structure with the subject compounds.

In addition to contact herbicidal activity, some of the compounds of this invention are active as pre-emergence herbicides; others possess activity of an insecticidal nature; still others are active as fungicides. Some of the compounds possess multiple activity in two or more of the above mentioned areas. Hence the user can benefit from the application of these compounds in a dual or multiple manner, depending upon which compound or mixture of compounds is selected.

The dithiooxamides of this invention are prepared by reacting the appropriately substituted phenyl isothiocyanate with a cyanide to produce a thiooxanilonitrile. The thiooxanilonitrile is then reacted with hydrogen sulfide to produce the corresponding dithiooxamide. The synthesis is more fully described in Reissert and Bruggemann, Ber., 57, 982 (1924).

The advantages and benefits of the present invention will become more fully understood when interpreted in view of the detailed description set forth in the following examples.

Example 1

A quantity of 45 grams of 2-ethoxyphenyl isothiocyanate, 135 grams of 1,2-dimethoxyethane, 18 grams of potassium cyanide, and 150 ml. of water were mixed together and stirred until the isothiocyanate dissolved. The amber solution was filtered and the filtrate diluted with 600 ml. of water. The filtrate was acidified with HCl, causing an orange liquid to separate and solidify. This solid, identified as 2-ethoxythiooxanilontrile, was filtered and air-dried. Upon crystallization from hexane, the melting point was 75–76° C. Analysis of the crude product was: C=58.29 and 58.27%, H=5.10 and 4.98%, S=15.12 and 15.30%; calculated for $C_{10}H_{10}N_2OS$: C=58.24%, H=5.24%, S=15.54%.

A quantity of 27 grams of 2-ethoxythiooxanilonitrile and 100 ml. of 20% ammonium sulfide solution were mixed in the presence of about 50 ml. of methanol. Upon standing overnight, a crystalline precipitate separated. The crystals were filtered, washed with water, and air-dried. Upon recrystallization from a heptane-toluene mixture, the product, identified as N-(2-ethoxyphenyl)dithiooxamide, had a melting point of 108–111° C. Analysis of the product was: C=50.43 and 50.48%, H=5.37 and 5.32%, S=26.19 and 26.08%; calculated for $$C_{10}H_{12}N_2OS_2: C=49.97\%$$

H=5.03%, S=26.68%.

Following the procedure described in Example 1, several dithiooxamides were prepared from the corresponding aromatic isothiocyanate. They are as follows:

(2) N-(2-tert-butylphenyl)dithiooxamide
(3) N-(2-tert-butyl-5-chloro-6-methylphenyl)dithiooxamide
(4) N-(4-tert-butylphenyl)dithiooxamide
(5) N-(3-chloro-4-methoxyphenyl)dithiooxamide
(6) N-(2,4-dimethoxyphenyl)dithiooxamide
(7) N-(3,4-dichlorophenyl)dithiooxamide
(8) N-(5-chloro-2-methoxyphenyl)dithiooxamide
(9) N-(2,4-ditert-butylphenyl)dithiooxamide
(10) N-(4-tert-butyl-2-methylphenyl)dithiooxamide
(11) N-(5-chloro-2,4-ditert-butyl-6-methylphenyl)dithiooxamide
(12) N-(2-tert-butyl-4-methylphenyl)dithiooxamide
(13) N-(2,5-dimethoxyphenyl)dithiooxamide
(14) N-(2-tert-butyl-6-methylphenyl)dithiooxamide
(15) N-phenyl dithiooxamide
(16) N-(4-tert-butyl-2,6-diethylphenyl)dithiooxamide
(17) N-(2-chlorophenyl)dithiooxamide
(18) N-(3-chlorophenyl)dithiooxamide
(19) N-(4-chlorophenyl)dithiooxamide
(20) N-(3-chloro-2-methylphenyl)dithiooxamide.

Melting points and elemental analyses for the prepared compounds are as follows:

TABLE I

| Example | Melting Point, °C. | Elemental Analysis, percent weight | |
|---|---|---|---|
| | | Calculated | Found |
| 2 | 111–112 | C=57.10<br>H=6.39<br>S=25.41 | C=57.19<br>H=6.47<br>S=25.10 |
| 3 | 100–101 | C=58.52<br>H=5.67<br>S=12.02 | C=59.52<br>H=5.99<br>S=11.28 |
| 4 | 111–114 | S=25.41 | S=24.70 |
| 5 | 167–170 | S=23.18 | S=23.50 |
| 6 | 148–154 | S=25.02 | S=25.05 |
| 7 | 160–162 | C=36.23<br>H=2.28<br>S=24.10 | C=36.21<br>H=2.34<br>S=23.85 |
| 8 | 143–146 | S=24.59 | S=24.23 |
| 9 | 129–130 | S=20.79 | S=20.63 |
| 10 | 118–120 | S=24.07 | S=23.02 |
| 11 | 179–180 | S=17.96 | S=17.43 |
| 12 | 139–140 | S=24.07 | S=23.98 |
| 13 | 135–137 | S=25.02 | S=24.81 |
| 14 | 175–176 | S=24.07 | S=24.24 |
| 15 | 97–98 | | |
| 16 | 115–116 | S=20.79 | S=20.79 |
| 17 | 139–140 | S=27.79 | S=28.00 |
| 18 | 130–131 | S=27.79 | S=27.98 |
| 19 | 180–181 | S=27.79 | S=27.71 |
| 20 | 138–139 | C=44.16<br>H=3.71<br>S=26.20 | C=44.11<br>H=3.75<br>S=26.09 |

Example 21

In this example, the contact herbicidal activity of selected dithiooxamides in greenhouse tests is reported. The plants on which the dithiooxamides were tested are designated in Table II as follows:

A=grass
B=broadleaf
C=morning glory
D=wild oats
E=brome grass
F=rye grass
G=radish
H=sugar beet
I=cotton
J=corn
K=foxtail
L=barnyard grass
M=crabgrass
N=pigweed
O=soybean
P=wild buckwheat
Q=tomato
R=sorghum
S=rice The dithiooxamides to be tested were applied in spray form to plants according to the following testing procedure. A good grade of topsoil was placed in aluminum pans to a depth of ⅜ to ½ inch from the top of the pan. On the top of the soil were placed a designated number of seeds of each of the plant species listed above. The seeds were covered by overfilling the pan with soil and striking it level. The pans were placed on a greenhouse bench where they were watered from below as needed to give adequate moisture for germination and growth.

The planted pans were maintained on the greenhouse bench under ordinary conditions of sunlight and watering for either 14 or 21 days. The age of the plants was varied in the testing to compensate for the difference in growth rates for different seasons of the year. Since the dithiooxamides were tested at different times of the year, the age difference of the plants was necessary to insure uniformity of response to the herbicides. After the proper growing period had elapsed, the plants were sprayed with 6 ml. of a 0.5% solution of the appropriate dithiooxamide, which corresponds to an application rate of approximately nine lbs. per acre. Secondary testing was performed on some compounds using 0.2% and 0.05% solutions of the dithiooxamides, which correspond to application rates of approximately four lbs. per acre and one lb. per acre, respectively. The herbicidal activity was measured and recorded 14 days after the spraying according to the following scale:

0 = no phytotoxicity
1 = slight phytotoxicvity
2 = moderate phytotoxicity
3 = severe phytotoxicity
4 = plant dead.

The numbered compositions appearing in the table below refer to the compositions prepared in the examples of corresponding number.

Data obtained from tests conducted in this manner are reported in Table II. In some of the evaluations, when the only selectivity shown was between monocotyledon and dicotyledon plans, i.e. when all grasses reacted similarly and all broad leaf plants reacted similarly, all the plants were classified as either grass or broadleaf, and the herbicidal activity of the dithiooxamides was noted accordingly.

TABLE III

| Sample | Aedes aegypti | Prodenia eridania |
|---|---|---|
| 1 | 100% at 10 p.p.m. | |
| 2 | 90% at 10 p.p.m. | 100% at 20 μg. |
| 3 | 100% at 10 p.p.m. | Do. |
|   | 90% at 2 p.p.m. | 100% at 10 μg. |
|   |   | 100% at 1 μg. |
| 4 | 100% at 10 p.p.m. | |
| 5 | do | |
| 7 | do | 60% at 10 μg. |
| 8 | do | Do. |
| 9 |   | 30% at 10 μg. |
| 10 | 50% at 10 p.p.m. | Do. |
| 11 |   | 100% at 10 μg. |
|   |   | 100% at 1 μg. |
| 12 | 90% at 10 p.p.m. | |
| 14 | do | 100% at 10 μg. |
| 16 | 50% at 10 p.p.m. | 60% at 10 μg. |
| 17 | 100% at 10 p.p.m. | |
| 18 | do | 70% at 10 μg. |
| 19 | do | 60% at 10 μg. |
| 20 | 60% at 10 p.p.m. | 100% at 10 μg. |
|   |   | 90% at 1 μg. |

TABLE II

| Composition | Concentration, Percent | Plant Type | | | | | | | | | | | | | | | | | |
|---|---|---|---|---|---|---|---|---|---|---|---|---|---|---|---|---|---|---|---|
| | | A | B | C | D | E | F | G | H | I | J | K | L | M | N | O | P | Q | R | S |
| 1 | 0.5 | 0 | 1 | 0 | 0 | 0 | 1 | 1 | 1 | --- | --- | 1 | --- | 1 | 1 | 0 | 2 | 4 | 0 | --- |
| 2 | 0.5 | 1 | 1 | 1 | 2 | 1 | 0 | 2 | 2 | --- | --- | 3 | --- | 3 | 4 | 1 | 3 | 0 | 1 | --- |
|   | 0.2 | 1 | 2 | 4 | 0 | 0 | 0 | 3 | 3 | 0 | 3 | 2 | 2 | 1 | 4 | 0 | 3 | 3 | 3 | --- |
|   | 0.05 | 0 | 1 | 0 | 0 | 0 | 0 | 1 | 4 | 0 | 1 | 0 | --- | 0 | 4 | 1 | 3 | 0 | 1 | 0 |
| 3 | 0.5 | 1 | 2 | 1 | 0 | 2 | 1 | 2 | 4 | --- | --- | 1 | --- | 2 | 4 | 1 | 0 | 4 | 2 | --- |
|   | 0.2 | 1 | 1 | 2 | 1 | 0 | 1 | 2 | 4 | 1 | 3 | 3 | 1 | 2 | 3 | 1 | 1 | 2 | 2 | --- |
| 4 | 0.5 | 1 | 2 | 2 | 2 | 2 | 0 | 2 | 2 | --- | --- | 2 | --- | 3 | 4 | 2 | 2 | 2 | 2 | --- |
| 5 | 0.5 | 0 | 2 | 3 | 0 | 0 | 0 | 2 | 4 | --- | --- | 0 | --- | 0 | 4 | 2 | 2 | 0 | 0 | --- |
| 6 | 0.5 | 0 | 1 | 0 | 0 | 0 | 0 | 2 | 4 | --- | --- | 2 | --- | 2 | 4 | 1 | 2 | 1 | 0 | --- |
|   | 0.5 | 1 | 2 | 0 | 3 | 1 | 3 | 4 | 4 | --- | --- | 2 | --- | 1 | 4 | 2 | 4 | --- | 1 | --- |
| 7 | 0.2 | 2 | 2 | 1 | 4 | 4 | 4 | 4 | 4 | 0 | 0 | 4 | 0 | 2 | 4 | 1 | 4 | 4 | 0 | 0 |
|   | 0.05 | 0 | 2 | 0 | 1 | 1 | 0 | 4 | 4 | 0 | 0 | 0 | 0 | 1 | 4 | 1 | 3 | 4 | 0 | 0 |
| 12 | 0.5 | 0 | 1 | 1 | 0 | 0 | 0 | 2 | 3 | --- | --- | 1 | --- | 1 | 4 | 1 | 2 | 1 | 1 | --- |
| 13 | 0.5 | 0 | 2 | 1 | 1 | 0 | 0 | 1 | 4 | --- | --- | 2 | --- | 2 | 4 | 1 | 3 | 1 | 1 | --- |
| 14 | 0.5 | 0 | 2 | 1 | 0 | 0 | 0 | 3 | 4 | --- | --- | 2 | --- | 2 | 4 | 1 | 2 | 2 | 1 | --- |
| 15 | 0.5 | 0 | 2 | --- | --- | --- | --- | --- | --- | --- | --- | --- | --- | --- | --- | --- | --- | --- | --- | --- |
| 16 | 0.5 | 0 | 3 | 4 | 0 | 1 | 0 | 3 | 3 | --- | --- | 0 | --- | 2 | 4 | 2 | 4 | 4 | 2 | --- |
| 17 | 0.5 | 0 | 3 | 1 | 0 | 0 | 0 | 3 | 4 | --- | --- | 2 | --- | 2 | 4 | 0 | 4 | 4 | 0 | --- |
|   | 0.5 | 1 | 3 | 4 | 1 | 1 | 0 | 4 | 4 | --- | --- | 3 | --- | 3 | 4 | 3 | 4 | 4 | 1 | --- |
| 18 | 0.2 | 0 | 3 | 3 | 0 | 1 | 0 | 3 | 4 | 2 | 1 | 2 | 1 | 2 | 4 | 1 | 4 | 4 | 2 | 0 |
|   | 0.05 | 0 | 1 | 0 | 0 | 0 | 0 | 0 | 2 | 1 | 1 | 0 | 0 | 0 | 4 | 1 | 4 | 4 | 0 | 0 |
|   | 0.5 | 0 | 2 | 1 | 0 | 0 | 0 | 4 | 4 | --- | --- | 0 | --- | 0 | 0 | 2 | 3 | 4 | 0 | --- |
| 19 | 0.2 | 0 | 2 | 1 | 0 | 0 | 0 | 3 | 3 | 0 | 0 | 0 | 0 | 0 | 1 | 1 | 4 | 4 | 0 | 0 |
|   | 0.05 | 0 | 1 | 0 | 0 | 0 | 0 | 1 | 1 | 0 | 0 | 0 | 0 | 0 | 4 | 1 | 4 | 4 | 0 | 0 |
| 20 | 0.5 | 0 | 2 | 2 | 0 | 0 | 0 | 1 | 3 | --- | --- | 0 | --- | 0 | 4 | 2 | 2 | 2 | 0 | --- |

*Example 22*

In this example, the insecticidal acivity of selected N-aryl dithiooxamides on mosquito larvae and armyworm larvae is reported. Insecticidal activity on mosquito larvae was tested in the following manner. A tube was filled with 50 ml. of distilled water. To this was added a sufficient quantity of a 1% solution of the appropriate dithiooxamide in acetone to bring the concentration of dithiooxamide to the desired level. Approximately 25 yellow fever mosquito larvae, *Aedes aegypti*, were transferred to the tube where they remained at room temperature for 24 hours, after which time mortality observations were measured and recorded.

Insecticidal activity on armyworm larvae was determined according to the following procedure. Ten leaf discs ¼ inch in diameter from an uninfested Wood's prolific lima bean plant were treated with one microliter of an acetone solution containing a specified number of micrograms of the appropriate dithiooxamide. One second instar southern armyworm larva, *Prodenia eridania*, was placed beside each leaf disc. The larva and disc were then enclosed within a plastic cap for 48 hours at room temperature, after which time mortality observations were measured and recorded. Results are reported below in Table III. The figures listed under the tested larvae indicate the mortality rate at the specified concentration of use.

Certain N-aryl dithiooxamides also exhibit activity as plant and soil fungicides. For example, N-phenyldithiooxamide is active as a soil fungicide against the organisms *Rhizoctonia solani* and *Pythium ultimum* at a concentration of 30 p.p.m. It is also active as a wheat rust eradicant at a concentration of 0.3%. In addition, N-(2-ethoxyphenyl)dithiooxamide, N - (2-tert-butylphenyl)dithiooxamide, N-(4-tert-butylphenyl)dithiooxamide, N-(5-chloro-2-methoxyphenyl)dithiooxamide, N-(3-chloro-4 - methoxyphenyl)dithiooxamide, N-(4-tert-butyl-2,6-diethylphenyl)dithiooxamide, N - (2-chlorophenyl)dithiooxamide, N-(3-chlorophenyl)dithiooxamide, N-(4-chlorophenyl)dithiooxamide, N - (3-chloro-2-methylphenyl)dithiooxamide, and N-(3,4-dichlorophenyl)dithiooxamide are fungicidally active against apple scab, *Venturia inaequalis*, at a concentration of 10 p.p.m.

The biologically active compounds of this invention are either solid or liquid materials, depending upon the particular substituents present in the compounds. To aid in achieving a uniform distribution of the active compounds over the entire area of the soil or plants to be treated, it is often advantageous to employ a composition comprising a diluent or extending agent in addition to the actual compounds. Suitable solid extending agents are those which render the compositions permanently dry and free-flowing. Therefore, hygroscopic materials are not preferred extending agents unless there is included in the composition a separate substance to aid flowability. Effective solid diluents include natural clays, such as china clays, bentonites, and the attapulgites. Other minerals in their natural state such as talc, pyrophylite, quartz, diatomaceous earth, Fuller's earth, chalk, rock phosphate, and sulfur; and chemically modified minerals, such as acid-washed bentonite, precipitated calcium phosphate, precipitated calcium carbonate, and colloidal silica. These diluents may represent a substantial portion, e.g., 50 to 98% by weight, of the entire formulation as applied to plant or soil. Formulations more concentrated with respect to the active ingredient may be prepared but they will usually require additional dilution by the user in order to properly prepare the composition for the most effective usage. Therefore the toxicant formulation as applied in the field will normally consist of a minor amount, i.e., less than 50% by weight of the entire formulation, of the N-aryl dithiooxamides and a major amount, or more than 50% of the entire formulation, of an adjuvant or adjuvants.

Liquid extending agents are also useful in the practice of this invention. The N-aryl dithiooxamides of this invention are insoluble in water and are readily soluble in most organic solvents. Therefore the choice of a liquid extending agent is quite variable if a solution of the active ingredients is desired. In addition, the active compounds need not be dissolved but merely dispersed in the extending agent in the form of a suspension or emulsion. One method of forming this dispersion is to dissolve the N-aryl dithiooxamides in a suitable organic solvent and then add this solution to water or some other liquid extending agent to form the dispersion. Examples of some organic solvents suitable for use as extending agents when a solution is desired include: alcohols such as ethyl, isopropyl, n-propyl, and butyl alcohols; ketones such as acetone, methylethyl ketones, and cyclohexanone; and aromatic hydrocarbons such as benzene, toluene, xylene and cumene. Solvents useful as extending agents when a dispersion of the active compound in the solvent is acceptable include: water, hexane, and other aliphatic hydrocarbons.

The incorporation of a surface active agent into the herbicidal formulation is an aid helpful in forming uniform dispersions or emulsions of the active N-aryl dithiooxamides in water. The surface active agent, that is the wetting, emulsifying, or dispersion agent, may be either anionic, cationic, non-ionic, or mixtures thereof. Suitable wetting agents are the organic compounds capable of lowering the surface tension of water and include the conventional soaps such as the water-soluble salts of long-chain carboxylic acids; the amino soaps, such as the amine salts of long-chain carboxylic acids; the sulfonated animal, vegetable and mineral oils; quaternary salts of high molecular weight acids; rosin soaps such as salts of abietic acid; sulfuric acid salts of high molecular weight organic compounds; algin soaps; and simple and polymeric compositions having both hydrophobic and hydrophilic functions.

The concentrated compositions of this invention ordinarily have the active ingredient in the surface active agent present in higher concentrations than the toxicant compositions applied in the field, so that upon dilution with an extending agent, compositions containing optimum proportions of active ingredient and surface active agent are prepared to obtain uniform distribution and to maintain the active ingredient in a form enabling prompt assimilation by the plants.

The concentrate compositions of this invention preferably comprise 5% to 95% by weight of the active ingredient, the remainder consisting of the adjuvant. If a liquid concentrate is desired, this adjuvant may be solely liquid extending agent or surface active agent, but preferably is a combination of the two. Preferably the surface active agent comprises from 0.1% to 15% of the concentrate, and the liquid extender comprises from 5% to 95% of the concentrate. If a solid concentrate is desired, the adjuvant is usually made up solely of a solid extender unless the dust concentrate is to be applied as a wettable powder, in which case an amount of surface active agent comparable to that used in the liquid formulation, that is 0.1% to 15%, may be desirable.

Carrier materials or diluents necessary to dilute the concentrates to a toxicological level suitable for plant control can be either a liquid or particulate solid. Materials mentioned previously as extenders can also be used as carriers; however the use of some of these materials as carriers is often not economically feasible. Water is a preferred liquid carrier; suitable solid carriers include solid fertilizers such as ammonium nitrate, urea, and super phosphate, as well as other materials in which plant organisms may take root and grow, such as compost, manure, humus and sand.

In addition to the above described conditioning agents, other adjuvants may be added, such as insecticides, fungicides, nematocides and other herbicides of a supplementary nature. This may be done when it is desired to broaden the spectrum of activity to include other problem weeds, insects or fungi.

The herbicidal compositions of this invention are applied to the plant systems in the conventional manner. Thus, the dust and liquid compositions may be applied to the foliage of growing plants or to the soil by the use of power-operated dusters and sprayers as well as manually operated devices. Some of the compounds of this invention provide superior protection and control when mixed with the top few inches of soil. This can be accomplished by addition of the composition to irrigation water supplied to the field to be treated. Dust compositions sprinkled on the surface of the soil can be distributed below the surface by the usual discing, dragging or mixing operations.

The application of a toxic amount of the N-aryl dithiooxamides to the area to be controlled is essential to the practice of this invention. The exact dosage to be applied is dependent not only upon the specific dithiooxamide but also upon the particular type of protection desired. As a general rule, the herbicidal activity of the N-aryl dithiooxamides is the most significant and the fungicidal and insecticidal activities are usually somewhat less pronounced. Herbicidal activity is usually achieved by application of the N-aryl dithiooxamides at a rate of from 0.5 to 25 lbs. per acre. However, lower rates of application may be required with some of the dithiooxamides, particularly if a herbicidally selective activity is desired, and higher rates may be required if it is desirable to include a fungicidally or insecticidally toxic amount of the dithiooxamide in the formulation.

The biologically active compounds of this invention have been described in terms of specific groups or types of N-aryl dithiooxamides. However, it should be noted that this invention is intended to cover those compounds in which the substituent groups (the R, R', R'', and X radicals) can also contain constituents other than those mentioned if these constituents do not interfere with the biological activity of the parent N-aryl dithiooxamide. Those skilled in the art will recognize that a compound containing a hydrocarbon radical that is substituted with a non-interfering group is the equivalent of the corresponding compound containing a non-substituted hydrocarbon radical. Such a non-interfering group can be initially present in a compound subjected to one of the reactions of this invention and can, depending upon circumstances, either be retained in the product molecule or be destroyed or changed during the reaction; or such group can be introduced by known means into one of the new compounds of this invention subsequent to the formation of such compound. Accordingly, these and other modifications are contemplated which can be made without departing from the spirit of the described invention.

What is claimed is:

1. A method for inhibiting the growth of existing plant systems comprising contacting said plant systems with a herbicidally effective amount of a compound of the formula

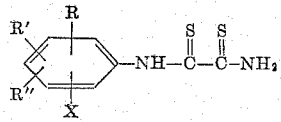

where R is selected from the group consisting of hydrogen, hydroxyl, and nitro, and aliphatic hydrocarbyl and aliphatic hydrocarbyloxy having up to 4 carbon atoms, R' and R'' are selected from the group consisting of hydrogen, hydroxyl, halogen, and nitro and aliphatic hydrocarbyl and aliphatic hydrocarbyloxy having up to 4 carbon atoms, and X is selected from the group consisting of hydrogen and halogen.

2. A method for inhibiting the growth of existing plant systems comprising contacting said plant systems with a herbicidally effective amount of an N-(monochlorophenyl)dithiooxamide.

3. A method for inhibiting the growth of existing plant systems comprising contacting said plant systems with a herbicidally effective amount of an N-(monochloro-monoalkylphenyl)dithiooxamide.

4. A method for inhibiting the growth of existing plant systems comprising contacting said plant systems with a herbicidally effective amount of an N-(monochlorodialkylphenyl)dithiooxamide.

5. A method for inhibiting the growth of existing plant systems comprising contacting said plant systems with a herbicidally effective amount of an N-(dichlorophenyl)dithiooxamide.

6. A method for inhibiting the growth of existing plant systems comprising contacting said plant systems with a herbicidally effective amount of an N-(dichloro-monoalkylphenyl)dithiooxamide.

7. A method for inhibiting the growth of existing plant systems comprising contacting said plant systems with a herbicidally effective amount of N-(3,4-dichlorophenyl)dithiooxamide.

8. A method for inhibiting the growth of plant systems comprising applying to an area to be controlled a herbicidally effective amount of a compound of the formula

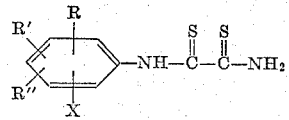

where R is selected from the group consisting of hydrogen, hydroxyl, and nitro, and aliphatic hydrocarbyl and aliphatic hydrocarbyloxy having up to 4 carbon atoms, R' and R'' are selected from the group consisting of hydrogen, hydroxyl, halogen, and nitro and aliphatic hydrocarbyl and aliphatic hydrocarbyloxy having up to 4 carbon atoms, and X is selected from the group consisting of hydrogen and halogen.

References Cited by the Examiner

UNITED STATES PATENTS

| | | | |
|---|---|---|---|
| 2,732,401 | 1/1956 | De La Mater | 260—551 |
| 2,772,309 | 11/1956 | Doerner | 260—551 |
| 2,837,417 | 6/1958 | Fischer | 71—2.7 |
| 2,941,879 | 6/1960 | Goodhue | 71—2.3 |
| 3,012,870 | 12/1961 | Richter | 71—2.6 |
| 3,048,483 | 8/1962 | Weil | 71—2.6 |

OTHER REFERENCES

Grabendo et al., Chemical Abstracts, vol. 56, column 10026(h), 1962.

Kumelj et al., Chemical Abstracts, vol. 54, column 22426(h), 1960.

LEWIS GOTTS, *Primary Examiner.*

JAMES O. THOMAS, Jr., *Examiner.*